United States Patent
Zavesky et al.

(10) Patent No.: US 12,444,005 B2
(45) Date of Patent: Oct. 14, 2025

(54) INTERNET OF THINGS-ENABLED DINNERWARE TO ENHANCE FOOD SERVICE OPERATIONS

(71) Applicant: AT&T Intellectual Property I, L.P., Atlanta, GA (US)

(72) Inventors: Eric Zavesky, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 355 days.

(21) Appl. No.: 18/063,633

(22) Filed: Dec. 8, 2022

(65) Prior Publication Data

US 2024/0193709 A1    Jun. 13, 2024

(51) Int. Cl.
*G06Q 50/12*    (2012.01)

(52) U.S. Cl.
CPC ..................... *G06Q 50/12* (2013.01)

(58) Field of Classification Search
CPC ....................................................... G06Q 50/12
USPC ............................................................. 705/15
See application file for complete search history.

(56) References Cited

U.S. PATENT DOCUMENTS

| | | | |
|---|---|---|---|
| 10,832,590 B2 | 11/2020 | Gopalan et al. | |
| 2019/0080629 A1* | 3/2019 | Gopalan | G16H 40/63 |
| 2019/0213416 A1* | 7/2019 | Cho | G06V 20/20 |

OTHER PUBLICATIONS

Kwon Namgung et al. Menu Recommendation System Using Smart Plates for Well-balanced Diet Habits of Young Children. Wireless Communications & Mobile Computing (Online); Oxford vol. 2019. (Year: 2019).*
Batista, Isaac Danilo Santos et al. Monitoring Restaurants in Real-Time. 2019 II Workshop on Metrology for Industry 4.0 and IoT, 2019. (Year: 2019).*

* cited by examiner

*Primary Examiner* — Fawaad Haider

(57) ABSTRACT

Methods, computer-readable media, and systems for enhancing food service operations using Internet of Things-enabled dinnerware are disclosed. One method performed by a processing system including at least one processor includes obtaining data about a food item that is being prepared for a consumer, forwarding the data about the food item to an internet of things-enabled item of dinnerware, receiving, from the internet of things-enabled item of dinnerware, data about consumption of the food item by the consumer, and providing feedback to an endpoint device of a person who prepared the food item for presentation to the person who prepared the food item, in response to the data about the consumption of the food item by the consumer.

20 Claims, 3 Drawing Sheets

INTERNET OF THINGS-ENABLED DINNERWARE TO ENHANCE FOOD SERVICE OPERATIONS

The present disclosure relates generally to food service operations, and relates more particularly to devices, non-transitory computer-readable media, and methods for enhancing food service operations using Internet of Things-enabled dinnerware.

BACKGROUND

In recent years, the food service industry has moved beyond point of sale interactions. For instance, it is not uncommon now for customers in a food service establishment to order and pay for their food via self-service kiosks, remote computers, or mobile phones.

SUMMARY

The present disclosure broadly discloses methods, computer-readable media, and systems for enhancing food service operations using Internet of Things-enabled dinnerware. In one example, a method performed by a processing system including at least one processor includes obtaining data about a food item that is being prepared for a consumer, forwarding the data about the food item to an internet of things-enabled item of dinnerware, receiving, from the internet of things-enabled item of dinnerware, data about consumption of the food item by the consumer, and providing feedback to an endpoint device of a person who prepared the food item for presentation to the person who prepared the food item, in response to the data about the consumption of the food item by the consumer.

In another example, a non-transitory computer-readable medium may store instructions which, when executed by a processing system including at least one processor, cause the processing system to perform operations. The operations may include obtaining data about a food item that is being prepared for a consumer, forwarding the data about the food item to an internet of things-enabled item of dinnerware, receiving, from the internet of things-enabled item of dinnerware, data about consumption of the food item by the consumer, and providing feedback to an endpoint device of a person who prepared the food item for presentation to the person who prepared the food item, in response to the data about the consumption of the food item by the consumer.

In another example, a device may include a processing system including at least one processor and a non-transitory computer-readable medium storing instructions which, when executed by the processing system, cause the processing system to perform operations. The operations may include obtaining data about a food item that is being prepared for a consumer, forwarding the data about the food item to an internet of things-enabled item of dinnerware, receiving, from the internet of things-enabled item of dinnerware, data about consumption of the food item by the consumer, and providing feedback to an endpoint device of a person who prepared the food item for presentation to the person who prepared the food item, in response to the data about the consumption of the food item by the consumer.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
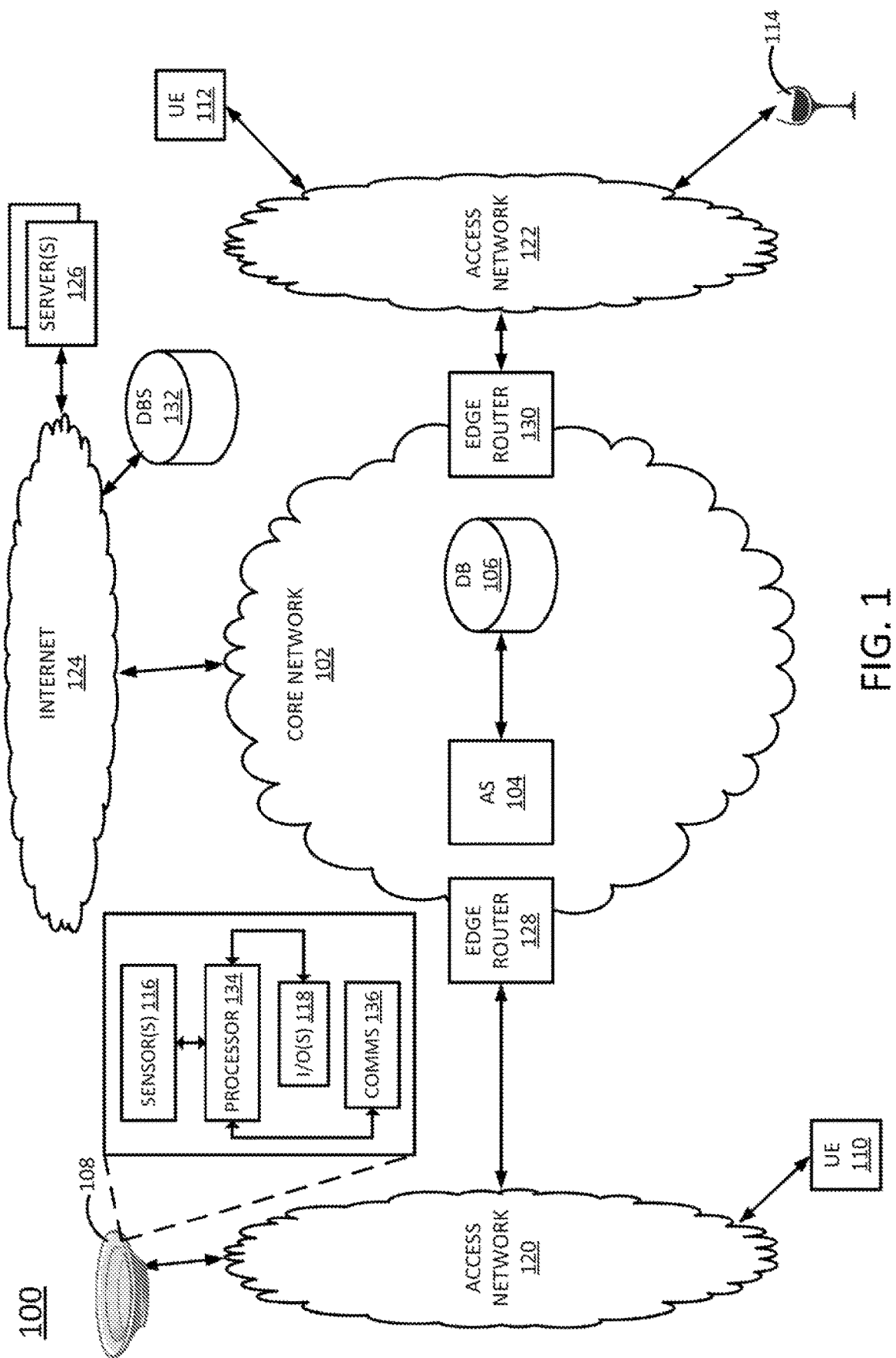
FIG. 1 illustrates an example system in which examples of the present disclosure for enhancing food service operations using Internet of Things-enabled dinnerware may operate.

The present disclosure broadly discloses methods, computer-readable media, and systems for enhancing food service operations using Internet of Things (IoT)-enabled dinnerware. As discussed above, in recent years, the food service industry has moved beyond point of sale interactions. For instance, it is not uncommon now for customers in a food service establishment to order and pay for their food via self-service kiosks, remote computers, or mobile phones.

Although these advancements offer a measure of convenience and efficiency when ordering and paying for food, the minimal human interaction can make it more difficult to gauge other elements of the customer experience, such as behavioral observation and engagement during consumption. For instance, if the customer simply takes their food and walks away to consume the food, it may be difficult to determine the customer's rate of consumption, response to the food (e.g., whether the customer like or do not like the food), whether the food presents any health or safety issues to the customer (e.g., the food is too hot or contains an ingredient to which the customer is allergic), or other information that may be useful to know in order to improve the customer experience. For instance, without knowing how quickly a customer is consuming his or her food, it may be difficult to tell when the customer may need a refill of his or her beverage or when to inquire if the customer would like a dessert.

Examples of the present disclosure provide IoT-enabled dinnerware, such as plates, bowls, cups, drinking glasses, mugs, and the like, which can serve to provide information about food and beverages served in the dinnerware to a person consuming the food and/or beverages. This may be helpful for consumers who have allergies to specific foods, who follow particular diets (e.g., low sodium, gluten free, etc.), or who are simply trying to be more mindful about their eating habits. The IoT-enabled dinnerware can also provide feedback to a person preparing and/or serving the food and beverages, so that the person preparing and/or serving the food and beverages may adjust their preparation and/or serving techniques to improve the experience of the person consuming the food and beverages. For instance, in a food service setting, knowing how quickly consumers are consuming their meal may help to determine when refills are needed, when the consumers are ready for a next course, and when inventory of certain items (e.g., food and beverage ingredients) needs replenishing.

Within the context of the present disclosure, the term "dinnerware" may be understood to refer to any type of vessel, container, or tool that is used to prepare, serve, and/or consume food and beverages. For instance, within the context of the present disclosure, the term "dinnerware" may refer to a plate, a bowl, a pan, a pot, a cutting board, drinkware (e.g., a cup, a mug, a drinking glass, etc.), a utensil (e.g., a fork, a knife, a spoon, a pair of chopsticks, etc.), or the like. These and other aspects of the present disclosure are discussed in greater detail below in connection with the examples of FIGS. 1-3.

To further aid in understanding the present disclosure, FIG. 1 illustrates an example system 100 in which examples of the present disclosure for enhancing food service operations using Internet of Things-enabled dinnerware may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, a media streaming service, or any other types of communication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a communication network service provider (e.g., an Internet service provider, or a service provider who provides Internet services in addition to other communication services). The core network 102 and the access networks 120 and 122 may be operated by different service providers, the same service provider or a combination thereof, or the access networks 120 and/or 122 may be operated by entities having core businesses that are not related to communications services, e.g., corporate, governmental, or educational institution LANs, and the like.

In one example, the access network 120 may be in communication with one or more user endpoint devices (UEs) 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an autonomous vehicle, an extended reality (XR) device, an Internet of Things (IOT) device, an application server, a bank or cluster of such devices, and the like.

In one example, at least some of the user endpoint devices 108, 110, 112, and 114 comprise IoT-enabled items of dinnerware. As discussed above, an item of "dinnerware" may comprise any type of vessel, container, or tool that is used to prepare, serve, and/or consume food and beverages. For instance, user endpoint devices 108 and 114 are illustrated as a plate and a wine glass, respectively. According to examples of the present disclosure, the user endpoint devices 108 and 114 are IoT enabled. This means that the plate and the wine glass each include (as shown in inset for user endpoint device 108 as an example) an integrated processor 134, sensor(s) 116, input/output (I/O) device(s) 118, and communication interface (COMMS) 136.

For each of the user endpoint devices 108 and 114, the processor 134 is in communication with the sensor(s) 116, I/O device(s) 118, and communication interface 136. The sensor(s) 116 may comprise one or more different types of sensors that are configured to detect conditions of a food item placed in contact with the user endpoint device 108 or 114, conditions of an environment surrounding the user endpoint device 108 or 114, and/or conditions of a consumer who is consuming the food item. For instance, the sensor(s) 116 may include at least one of: an imaging sensor (e.g., a camera), an audio sensor (e.g., a microphone), a temperature sensor (e.g., a thermometer), a pressure sensor, an accelerometer, a salinity sensor, a pH sensor, an ionic strength sensor, a droplet crystallinity sensor, a biometric sensor (e.g., a sensor capable of measuring a person's pulse rate, blood oxygen level, blood alcohol content, blood pressure, body temperature, skin conductivity, blood glucose level, or other biometric parameters), and/or another type of sensor.

The I/O device(s) 118 may comprise one or more devices configured to present information to the consumer and/or to receive inputs from the consumer. In one example, the I/O device(s) 118 may comprise one or more of: a display, a speaker, a microphone, a touch screen, or a haptic feedback device. For instance, display elements embedded in the surface of a plate may allow messages (e.g., text and/or images) to be displayed on the surface of the plate. A haptic feedback element embedded in the stem of a wine glass may allow haptic feedback, such as a slight rumble or vibration, to be emitted by the wine glass.

The communication interface 136 may comprise a wireless communication device (e.g., a WiFi transceiver, a Bluetooth transceiver, or the like) that allows the user endpoint device 108 or 114 to communicate with the AS 104, the server(s) 126, and/or other user endpoint devices 108, 110, 112, and 114. For instance, the communication interface 136 may allow the user endpoint device 108 to share information collected by the sensor(s) 116 with the AS 104, the server(s) 126, and/or with other user endpoint devices 110, 112, and 114. The communication interface 136 may also allow the user endpoint device 108 to receive data from the AS 104, the server(s) 126, and/or with other user endpoint devices 110, 112, and 114.

Some of the user endpoint devices (e.g., user endpoint devices 110 and 112) may comprise mobile phones, tablet computers, smart glasses or goggles, or other types of user endpoint devices. The user endpoint devices 110 and 112 may be operated by individuals preparing and serving food items in a food service establishment (e.g., kitchen staff, wait staff, etc.), by individuals consuming the food items (e.g., customers), and/or by other individuals associated with the individuals consuming the food items (e.g., doctors, teachers, parents, and/or other caregivers).

The AS 104 may cooperate with a software client running on one or more of the user endpoint devices 108, 110, 112, and 114 to provide one or more services to the user endpoint devices 108, 110, 112, and 114. For instance, the AS 104 may host an application that provides information about food items that are prepared, served, or stored in the user endpoint devices 108 and 114. The AS 104 may also receive feedback from the user endpoint devices 108 and 114 regarding the consumption of the food items, where the feedback may be used to streamline service to consumers (e.g., determine when refills are needed or a next course may be served) or to optimize kitchen operations (e.g., cook line, inventory control, menu planning, etc.). One example method for enhancing food service operations using Internet of Things-enabled dinnerware is described in greater detail below in connection with FIG. 2.

In one example, one or more of the servers 126 and one or more of the databases (DBs) 132 may be accessible to user endpoint devices 108, 110, 112, and 114 and to the AS 104 via Internet 124 in general. The server(s) 126 and DBs 132 may operate in a manner similar to the AS 104 and DB 106, as described in further detail below.

Figure 3:
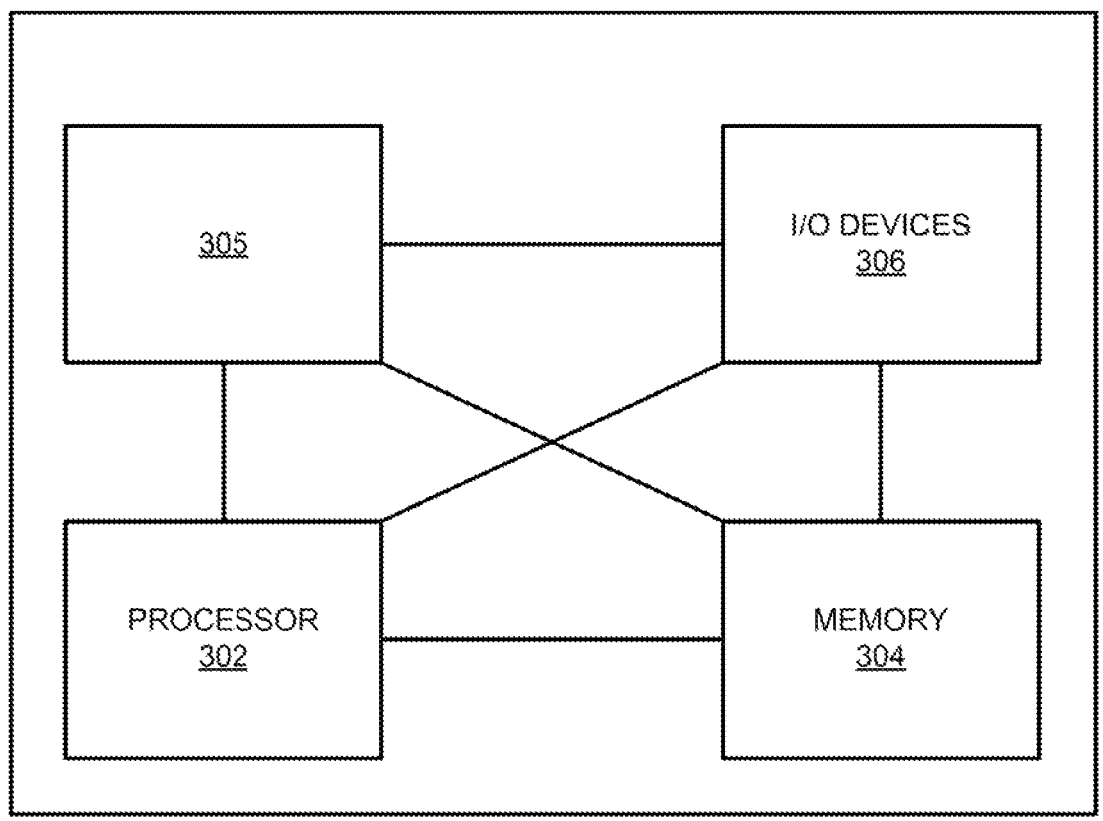
FIG. 3 illustrates an example of a computing device, or computing system, specifically programmed to perform the steps, functions, blocks, and/or operations described herein.

The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the DB 106 may comprise a physical storage device integrated with the AS 104 (e.g., a database server or a file server), or attached or coupled to the AS 104, in accordance with the present disclosure. The DB 106 may store information related to various food items (e.g., ingredients, popularity with consumers, other food items that pair well, nutritional information, potential allergens, amount present in inventory of a food service establishment, etc.). The DB 106 may also store user profiles that specify the food preferences and/or restrictions of individual consumers (e.g., food allergies, dietary restrictions, likes and dislikes, etc.). In one example, the user profiles may include information that allows IoT-enabled dinnerware utilized in a food service establishment to communicate or pair with user endpoint devices of the consumers (e.g., allows an IoT-enabled plate or drinking glass to send information to and receive information from a consumer's mobile phone or smart watch). In one example, the AS 104 may load instructions into a memory, or one or more distributed memory units, and execute instructions for providing a service to user endpoint devices 108, 110, 112, and 114.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
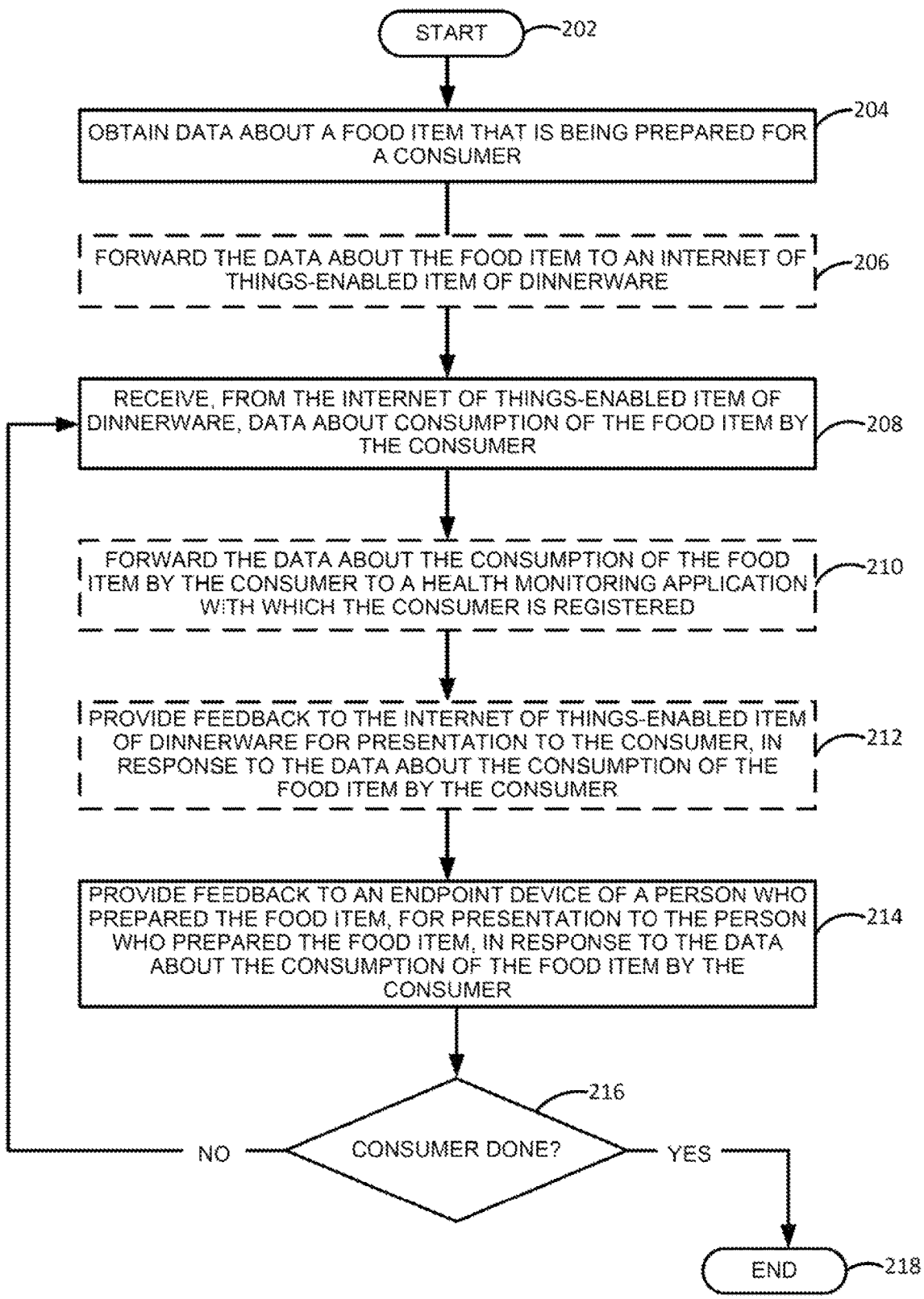
FIG. 2 illustrates a flowchart of an example method for enhancing food service operations using Internet of Things-enabled dinnerware, according to examples of the present disclosure.

FIG. 2 illustrates a flowchart of an example method 200 for enhancing food service operations using Internet of Things-enabled dinnerware, in accordance with the present disclosure. In one example, steps, functions and/or operations of the method 200 may be performed by a device as illustrated in FIG. 1, e.g., an application server 104 or any one or more components thereof. In another example, the steps, functions, or operations of method 200 may be performed by a computing device or system 300, and/or a processing system 302 as described in connection with FIG. 3 below. For instance, the computing device 300 may represent at least a portion of AS 104 in accordance with the present disclosure. For illustrative purposes, the method 200 is described in greater detail below in connection with an example performed by a processing system, such as processing system 302.

The method 200 begins in step 202 and proceeds to step 204. In step 204, the processing system may obtain data about a food item that is being prepared for a consumer.

In one example, the data about the food item may include at least one of: ingredients of the food item, a temperature at which the food item was prepared, a temperature at which the food item is to be served, customizations to the food item that were requested by a consumer who is to consume the food item (e.g., a temperature and/or a time duration to which to cook a piece of meat, a substitution of a default ingredient, or the like), a quantity or size of the food item, other food items that are recommended to be paired with the food item, nutritional information for the food item (e.g., estimated number of calories, grams of salt, fat, or carbohydrates, or the like), and the like.

In one example, at least some of the data about the food item may be acquired by first identifying the food item, and then looking the food item up in a database of food items. For instance, in one example, if the processing system is able to obtain an image of the food item, then the processing system may perform recognition processing on the image to identify the food item. In another example, a human user may speak the name of the food item into a microphone or type the name of the food item into a keyboard that provides inputs to the processing system. In another example, a human user may operate a scanner to scan a machine readable code (e.g., a bar code, a quick response code, or the like) affixed to the food item (or its packaging) or to an ingredient of the food item.

The identity of the food item may be indexed in the database to at least some of the data about the food item. For instance, an entry in the database for a "small matcha latte" may indicate that the food item "small matcha latte" contains three quarters of a cup of milk, one and one half teaspoons of matcha powder, and one tablespoon of hot, but not boiling, water. Other data about the food item may be supplied by a human user. For instance, a waiter who has taken an order from the consumer in a food service establishment may provide an identity of the food item to the processing system (e.g., "small matcha latte") and may supplement the identity with further information (e.g., "substitute almond milk for cow's milk").

In optional step 206, the processing system may forward the data about the food item to an Internet of Things-enabled item of dinnerware. As discussed above, in one example, an IoT-enabled item of dinnerware may comprise any type of vessel used to prepare, serve, and/or store a food item, such as a plate, a bowl, a drinking glass, a mug, a fork, a spoon, a knife, a pan, a pot, a cutting board, a storage container, or the like. The vessel may include one or more integrated sensors and one or more integrated input/output (I/O) devices that are capable of sending and receiving data via a network (e.g., the Internet). The integrated sensors may include one or more of: an imaging sensor (e.g., a camera), an audio sensor (e.g., a microphone), a temperature sensor (e.g., a thermometer), a pressure sensor, an accelerometer, a biometric sensor (e.g., a sensor capable of measuring a person's pulse rate, blood oxygen level, blood alcohol content, blood pressure, body temperature, skin conductivity, blood glucose level, or other biometric parameters), and/or another type of sensor. Any one or more of the sensors integrated into the IoT-enabled item of dinnerware may be capable of recording data about a user of the IoT-enabled item of dinnerware (e.g., a consumer of the food item) and of delivering the data, via a wireless network connection, to the processing system.

The integrated I/O devices may include one or more of: a visual output device (e.g., a display, a touch screen, or the like), an audio output device (e.g., a speaker), a haptic output device (e.g., a rumble or vibrating mechanism), an olfactory output device (e.g., a scent generator), and/or another type out I/O device. Any one or more of the integrated I/O devices may be used to present feedback, provided by the processing system via a wireless network connection, to the user of the IoT-enabled item of dinnerware.

In step 208 (illustrated in phantom), the processing system may receive, from the Internet of Things-enabled item of dinnerware, data about consumption of the food item by the consumer. In one example, the data about the consumption of the food item may comprise an amount of the food item that the consumer has consumed (e.g., a quantity, such as a number of grams or calories consumed, or a percentage of the original serving size that has been consumed). In another example, the data about the consumption of the food item may also comprise a rate at which the consumer is consuming the food item (e.g., an average rate, a slowest or fastest rate, whether the rate is speeding up or slowing down, etc.). In another example, the data about the consumption of the food item may comprise other types of data about the consumption, such as the steadiness with which the consumer handles utensils or the pressure applied by the consumer to the utensils (e.g., how hard the consumer cuts the food item with a knife or a fork, thereby potentially providing insights into the tenderness of the food item).

In another example, the data about the consumption of the food item may include biometric data of the consumer that is collected at the time that the consumer is consuming the food item. For instance, the biometric data may include the consumer's blood glucose level, blood alcohol content, skin conductivity, breathing rate, or other biometric data. In a further example still, the data about the consumption of the food item may include environmental data that is collected from the location where and at the time that the consumer is consuming the food item. For instance, the environmental data may include images, audio samples, temperature readings, or the like that are collected from the location (e.g., an indoor location, an outdoor location, at a park, at a cafeteria, at a restaurant, at home, etc.) where the consumer is consuming the food item.

In one example, the data about the consumption of the food item may include a response of the consumer to an inquiry presented via the IoT enabled item of dinnerware. For instance, as discussed in further detail below, the processing system may present feedback to the consumer via I/O devices that are integrated into the IoT-enabled item of dinnerware. This feedback may include an inquiry (e.g., "Is the soup hot enough?," "Do you want a refill on your drink?," "Do you need ketchup?," etc.) that seeks a response from the consumer. In one example, any such response may be received in step 208, where the response may include a spoken response, a typed response (e.g., provided via an I/O device of the IoT-enabled item of dinnerware or another endpoint device such as the consumer's mobile phone), a gesture (e.g., a nod or shake of the head, or an interaction with a touch screen of the IoT-enabled item of dinnerware or another endpoint device), or the like.

In one example, the data about the consumption of the food item, including any included biometric data of the consumer, may comprise raw data that is collected by one or more of the sensors integrated into the IoT-enabled item of dinnerware and subsequently delivered to the processing system for further analysis.

In optional step 210 (illustrated in phantom), the processing system may forward the data about the consumption of the food item by the consumer to a health monitoring application with which the consumer is registered. For instance, as discussed above, the data about the consumption of the food item, including any included biometric data of the consumer, may comprise raw data that is collected by one or more of the sensors integrated into the IoT-enabled item of dinnerware and subsequently delivered to the processing system for further analysis. In the course of this further analysis, the processing system may draw certain conclusions or inferences about the state of the food item and/or the consumer. These conclusions or inferences may be compared to rules that are configured in a health monitoring application.

As an example, a consumer who is diabetic may configure the health monitoring application to ensure that the consumer's blood glucose level is maintained within a predefined range. Thus, when the processing system determines, in the course of the consumer consuming the food item, that the consumer's blood glucose level is either above or below the predefined range, the processing system may alert the health monitoring application (so that the health monitoring application may, in turn alert the consumer or generate a recommended action). Similarly, the processing system could alert the health monitoring application if the consumer's blood alcohol content is determined to exceed a predefined limit, or if the consumer's blood alcohol content is rising at a rate that is faster than a predefined rate. In another example, the processing system could alert the health monitoring application when the consumer's breathing rate is determined to fall below a predefined rate (e.g., possibly indicating anaphylaxis/exposure to an unknown or undetected allergen). In another example, the processing system may alert the health monitoring application when the consumer is determined to have consumed or is believed to about to consume a food item that contains an ingredient to which the consumer is known to be allergic. In another example, the consumer may configure the health monitoring application to track the consumer's food intake statistics (e.g., number of calories consumed, amount of salt, sugar, or the like consumed). In this case, the processing system may alert the health monitoring application to any updates in the food intake statistics.

In another example, rather than alerting the health monitoring application in response to an inference that is drawn from the data about the consumption of the food item, the processing system may simply forward the raw data received from the IoT-enabled item of dinnerware to the health monitoring application, thereby allowing the health monitoring application to perform its own processing and inference making.

In optional step 212 (illustrated in phantom), the processing system may provide feedback to the Internet of Things-enabled item of dinnerware for presentation to the consumer, in response to the data about the consumption of the food item by the consumer. In one example, the feedback provided in step 212 may comprise a warning. For instance, as discussed above, the processing system may determine that the consumer's blood glucose level is above or below a predefined range, that the consumer's blood alcohol content is increasing at a rate that is more rapid than a predefined threshold rate, that the food item may contain an ingredient that the consumer is allergic to, or the like. In another example, the warning may indicate a current temperature of the food item and include a recommendation that the consumer wait a few minutes to allow the food item to cool before attempting to eat the food item.

In another example, the feedback provided in step 212 may comprise a recommendation. For instance, as discussed above, information about the food item that is stored in a database may identify other food items that pair well with the food item (which may be suggested by a person preparing the food item or crowd sourced from prior consumers of the food item). Thus, the feedback may comprise a recommendation of another food item (e.g., a side dish, a particular type of beverage, or the like) that pairs well with the food item.

In another example, the feedback provided in step 212 may comprise information or facts about the food item. For instance, if the food item is a cup of coffee, the feedback may indicate where the beans from which the coffee was brewed were grown. If the food item was produced by or includes an ingredient sourced from a local business (e.g., a pie baked by a local bakery, or made with eggs from a local farm), the feedback may include information about the local business.

In another example, the feedback provided in step 212 may comprise an inquiry. For instance, if the consumer has nearly finished the food item, the feedback may comprise an inquiry as to whether the consumer would like a refill of the food item or would like to order a next course (e.g., if the food item is an entree, whether the consumer would like to order a dessert). In another example, if the processing system detects that the consumer may be having difficulty consuming the food item (e.g., difficulty cutting a piece of meat, or using a pair of chopsticks), the inquiry may inquire whether the consumer requires assistance (e.g., a sharper knife, a fork, or the like). In yet another example, if the rate at which the consumer is consuming the food item falls below a predefined threshold (potentially indicating that the consumer does not like the food item or requires a condiment or the like), the inquiry may inquire as to whether the consumer would like to replace the food item with another different food item or would like to add something to the food item (e.g., salt, ketchup, hot sauce, etc.).

In one example, the feedback provided in step 212 may be presented via one or more I/O devices that are integrated into the IoT-enabled item of dinnerware. For instance, the IoT-enabled item of dinnerware may comprise a plate that includes display elements. In this case, the feedback may be displayed as a message (e.g., text and/or images) on the surface of the plate. In another example, the IoT-enabled item of dinnerware may comprise a utensil that includes a haptic feedback mechanism. In this case, the feedback may be presented as a rumble or vibration of the utensil to get the consumer's attention. In another example, the IoT-enabled item of dinnerware may comprise a plate or a drinking glass that includes a speaker. In this case, the feedback may comprise an audio message or an audio effect (e.g., a beep, a ring, a tone, or the like) that is emitted by the speaker. In another example, the IoT-enabled item of dinnerware may communicate with a proximal device for the consumer's experience. For instance, computing/communicating items may exist on table systems (e.g., display, audio, or tactile items), in the consumer's immediate environment (e.g., music, ambient temperature, ambient airflow, etc.), and in the dining furniture (e.g., heating or cooling systems for a chair, etc.) or consumer-provided devices (e.g., auto-cooling or ventilating clothing, shoes, etc.).

In step 214, the processing system may provide feedback to an endpoint device of a person who prepared the food item for presentation to the person who prepared the food item, in response to the data about the consumption of the food item by the consumer. In one example, the feedback provided in step 214 may indicate a rate at which the consumer is consuming the food item or an amount of the food item that remains. This may indicate that the consumer may soon need a refill of the food item (e.g., the consumer's beverage is almost gone) or may need another food item (e.g., the consumer has finished his entrée and may be ready to order a dessert). This may also help the person who prepared the food item to manage inventory. For instance, if diners in a restaurant are drinking a particular type of wine at a quicker than expected rate, the management of the restaurant may wish to order more of that particular type of wine sooner than initially planned.

In another example, the feedback provided in step 214 may indicate which food items consumers tend to enjoy or not enjoy. For instance, most consumers who order a dish that is served with mashed potatoes and coleslaw may tend to finish the mashed potatoes, but not finish the coleslaw. This may indicate that the mashed potatoes are considered a "favorite" food of the consumers, while the coleslaw is not considered a "favorite" food. As such, the person who prepared the dish may determine that it does not make fiscal sense to serve coleslaw as a side with the dish, since most consumers do not like or do not eat the coleslaw. The feedback provided in step 214 may also allow for A/B testing of recipes. For instance, if the person who prepared the food item is attempting to formulate a recipe for the food item, the person may experiment with different combinations of ingredients when preparing the food item (e.g., "half the pepper," "replace cow's milk with almond milk," "use Fuji apples instead of McIntosh," etc.). Consumer feedback (e.g., reactions, whether the consumers finished or did not finish the food item, etc.) may help to determine which combinations of ingredients are most popular.

In another example, the feedback may comprise data to assist in generating a bill for the consumer. For instance, the feedback may be provided to a billing system that tracks items ordered and keeps a running tab for the consumer and/or the dining party as a whole.

In step 216, the processing system may determine whether the consumer is done consuming the food item. In one example, a determination as to whether the consumer is done consuming the food item may be based on implicit information collected by the sensors integrated in the IoT-enabled item of dinnerware. For instance, if pressure sensors integrated into a plate detect that the plate is empty, or if an imaging sensor integrated into the plate detects nothing on the plate, then this may indicate that the consumer is done consuming the food item. Similar, if an accelerometer integrated into a fork detects that the consumer is holding and/or utilizing the fork, or if an audio sensor integrated into a plate detects that the consumer is asking a companion if they would like to try the food item, then this may indicate that the consumer is not done consuming the food item.

In another example, a determination as to whether the consumer is done consuming the food item may be based on explicit information collected by the sensors integrated in the IoT-enabled item of dinnerware. For instance, as discussed above, one example of step 212 may include presenting an inquiry to the consumer via one or more integrated I/O devices of the IoT-enabled item of dinnerware. In one example, the inquiry may inquire whether the consumer is still consuming the food item or is done consuming the food item. Thus, in this case, the determination as to whether the consumer is done consuming the food item may be based on the consumer's response to such an inquiry.

If the processing system concludes in step 216 that the consumer is not done consuming the food item, then the method 200 may return to step 208, and the processing system may continue to receive data about the consumption of the food item by the consumer and to provide responsive feedback, as discussed above. Similarly, the determination of the consumer's consumption rate may be used to better inform availability and reservation systems. For example, understanding whether the consumer's continuing consumption rate (and the expected remaining courses or items) are above, below, or on par with the typical consumption rate for historical consumers consuming these food items may help to estimate when resources in use by the consumer (e.g., a table in a restaurant) may become free for use by other consumers.

Thus, the processing system may continue to monitor the consumer's consumption of the food item and to provide feedback to the consumer, to the person who prepared the food item, and/or to a health monitoring application as appropriate.

If, however, the processing system concludes in step 216 that the consumer is done consuming the food item, then the method 200 may end in step 218.

In one example, when the method 200 ends, the processing system may provide a summary to any one or more of: the endpoint device of the person who prepared the food item, the Internet of Things-enabled item of dinnerware, or the health monitoring application. For instance, an IoT-enabled plate that includes built-in display elements may display a summary of calories consumed, grams of salt, sugar, vitamins, and the like consumed, or other information, to the consumer. Similar information could be provided to a health monitoring application, as discussed above.

In another example, the summary could be forwarded to an endpoint device of the consumer, such as the consumer's mobile phone or tablet computer. For instance, the IoT-enabled item of dinnerware may provide the option to "click" a button or speak a command to send a copy of the summary to the consumer's email or text messages. In a further example, options may be provided to have additional information that could be sent to the consumer's endpoint device. This additional information could include a recipe for the food item, an option to automatically place another order for the food item, an option to access a reservation system, and/or other information.

In another example, a summary that is presented via an endpoint device of the person who prepared the food may indicate the quantities of different ingredients that were consumed (which may assist with inventory planning), relative quantities of different food items that were consumed (e.g., the mashed potatoes are completely gone, but the consumer did not touch the coleslaw), and/or other information.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, examples of the present disclosure provide IoT-enabled dinnerware which can serve to provide information about food and beverages served in the dinnerware to a person consuming the food and beverages. This may be helpful for consumers who have allergies to specific foods, who follow particular diets (e.g., low sodium, gluten free, etc.), or who are simply trying to be more mindful about their eating habits. The IoT-enabled dinnerware can also provide feedback to a person preparing and/or serving the food and beverages, so that the person preparing and/or serving the food and beverages may adjust their preparation and/or serving techniques to improve the experience of the person consuming the food and beverages. For instance, in a food service setting, knowing how quickly consumers are consuming their meal may help to determine when refills are needed, when the consumers are ready for a next course, and when inventory of certain items (e.g., food and beverage ingredients) needs replenishing. This knowledge may also help to optimize the cook line (e.g., by knowing where to allocate kitchen staff), to increase food delivery to the consumers, and/or minimize food waste.

As discussed above, in some examples, the IoT-enabled dinnerware may be able to receive inputs or direct feedback from a consumer as well as provide outputs or feedback to the consumer. Thus, for example, in addition to providing information about a food item being consumed, the dinnerware could present inquiries to the consumer, including options to automatically order refills. Consumer responses to such inquiries could be provided directly to endpoint devices in food preparation areas (e.g., kitchens). In further examples, consumer responses could be provided to automated systems such as drones that are capable of delivering refills and other ordered items.

In addition, the IoT-enabled dinnerware may be used to encourage behavioral changes in consumers (e.g., to eat more slowly, to eat more vegetables, etc.) by providing real time feedback on consumption habits.

In further examples, the IoT-enabled dinnerware could be used to train people who prepare food on preparation techniques (e.g., cooking temperatures, knife skills, etc.). For instance, an IoT-enabled knife or cutting board could monitor a user's cutting of a vegetable and provide feedback on how to cut the vegetable more safely and/or efficiently.

In further examples, the sensors integrated in the IoT-enabled dinnerware may be used to facilitate tracking of the dinnerware for inventory and cleanliness purposes. For instance, the sensors could be used to help track when the IoT-enabled dinnerware was last used, last washed, by whom the IoT-enabled dinnerware was used, and the like.

I/O devices integrated in the dinnerware may be used to enhance presentation of food items, for instance by adjusting lighting or other environmental elements. In further examples still, the I/O devices could be used to change the properties of a food item (e.g., by applying a vibration or an electric field or dispensing an ingredient to change a texture or color of the food item). The I/O devices could also be used to change properties of the dinnerware, such as a flow rate of a drinking glass.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for enhancing food service operations using Internet of Things-enabled dinnerware, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for enhancing food service operations using Internet of Things-enabled dinnerware (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for enhancing food service operations using Internet of Things-enabled dinnerware (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
obtaining, by a processing system including at least one processor, data about a food item that is being prepared for a consumer, wherein the data about the food item includes at least one of: ingredients of the food item, a temperature at which the food item was prepared, a temperature at which the food item is to be served, at least one customization to the food item that was requested by the consumer, a quantity of the food item, a size of the food item, at least one other food item that is recommended to be paired with the food item, or nutritional information for the food item, and wherein the data about the food item is retrieved from a database of food items;
forwarding, by the processing system, the data about the food item to an internet of things-enabled item of dinnerware used by the consumer to consume the food item, wherein the internet of things-enabled item of dinnerware comprises at least one of: a plate, a bowl, a drinking glass, a mug, a fork, a spoon, a knife, a pan, a pot, a cutting board, or a storage container, wherein the internet of things-enabled item of dinnerware includes at least one integrated sensor, and wherein the at least one integrated sensor comprises at least one of: an imaging sensor, an audio sensor, a temperature sensor, a pressure sensor, an accelerometer, a salinity sensor, a pH sensor, an ionic strength sensor, a droplet crystallinity sensor, or a biometric sensor;
receiving, by the processing system from the internet of things-enabled item of dinnerware, data about consumption of the food item by the consumer, wherein the data about consumption of the food item by the consumer comprises at least one of: an amount of the food item that the consumer has consumed, a rate at which the consumer is consuming the food item, or an estimation of remaining time needed by the consumer to finish consuming the food item;
providing, by the processing system, feedback to a drone for presentation to a person who prepared the food item, in response to the data about the consumption of the food item by the consumer, and the feedback comprises a signal that controls the drone to deliver an additional food item to the consumer, and wherein the drone is a separate device from the processing system and from the internet of things-enabled item of dinnerware; and
providing, by the processing system, feedback to the internet of things-enabled item of dinnerware for presentation to the consumer, in response to the data about the consumption of the food item by the consumer, wherein the feedback provided to the internet of things-enabled item of dinnerware is presented via an integrated input/output device of the internet of things-enabled item of dinnerware, and wherein the integrated input/output device comprises at least one of: a visual output device, an audio output device, a haptic output device, or an olfactory output device.

2. The method of claim 1, wherein the data about consumption of the food item by the consumer further comprises at least one of: a steadiness with which the consumer handles a utensil, a pressure applied by the consumer to the utensil, biometric data of the consumer that is collected at the time that the consumer is consuming the food item, or a response of the consumer to an inquiry presented via the internet of things-enabled item of dinnerware.

3. The method of claim 2, wherein the biometric data includes at least one of: a blood glucose level of the consumer, a blood alcohol content of the consumer, a skin conductivity of the consumer, or a breathing rate of the consumer.

4. The method of claim 1, further comprising:
forwarding, by the processing system, the data about the consumption of the foot item by the consumer to a health monitoring application with which the consumer is registered.

5. The method of claim 1, wherein the feedback to the internet of things-enabled item of dinnerware comprises a warning regarding at least one of: an ingredient of the food item, a temperature of the food item, or the rate at which the consumer is consuming the food item.

6. The method of claim 1, wherein the feedback to the internet of things-enabled item of dinnerware comprises a recommendation regarding another food item that pairs well with the food item.

7. The method of claim 1, wherein the feedback to the internet of things-enabled item of dinnerware comprises information about a source of the food item.

8. The method of claim 1, wherein the feedback to the internet of things-enabled item of dinnerware comprises an inquiry to be answered by the consumer.

9. The method of claim 8, wherein the inquiry relates to at least one of: a need for a refill of the food item, a need for another food item to be added to the food item, a need for a utensil to consume the food item, whether the consumer likes the food item, or whether the consumer would like to replace the food item with a different food item.

10. The method of claim 1, wherein the data about the food item is further forwarded to a user endpoint device of the consumer.

11. A non-transitory computer-readable medium storing instructions which, when executed by a processing system including at least one processor, cause the processing system to perform operations, the operations comprising:
obtaining data about a food item that is being prepared for a consumer, wherein the data about the food item includes at least one of: ingredients of the food item, a temperature at which the food item was prepared, a temperature at which the food item is to be served, at least one customization to the food item that was requested by the consumer, a quantity of the food item, a size of the food item, at least one other food item that is recommended to be paired with the food item, or nutritional information for the food item, and wherein the data about the food item is retrieved from a database of food items;

forwarding the data about the food item to an internet of things-enabled item of dinnerware used by the consumer to consume the food item, wherein the internet of things-enabled item of dinnerware comprises at least one of: a plate, a bowl, a drinking glass, a mug, a fork, a spoon, a knife, a pan, a pot, a cutting board, or a storage container, wherein the internet of things-enabled item of dinnerware includes at least one integrated sensor, and wherein the at least one integrated sensor comprises at least one of: an imaging sensor, an audio sensor, a temperature sensor, a pressure sensor, an accelerometer, a salinity sensor, a pH sensor, an ionic strength sensor, a droplet crystallinity sensor, or a biometric sensor;

receiving, from the internet of things-enabled item of dinnerware, data about consumption of the food item by the consumer, wherein the data about consumption of the food item by the consumer comprises at least one of: an amount of the food item that the consumer has consumed, a rate at which the consumer is consuming the food item, or an estimation of remaining time needed by the consumer to finish consuming the food item;

providing feedback to a drone for presentation to a person who prepared the food item, in response to the data about the consumption of the food item by the consumer, and the feedback comprises a signal that controls the drone to deliver an additional food item to the consumer, and wherein the drone is a separate device from the processing system and from the internet of things-enabled item of dinnerware; and providing feedback to the internet of things-enabled item of dinnerware for presentation to the consumer, in response to the data about the consumption of the food item by the consumer, wherein the feedback provided to the internet of things-enabled item of dinnerware is presented via an integrated input/output device of the internet of things-enabled item of dinnerware, and wherein the integrated input/output device comprises at least one of: a visual output device, an audio output device, a haptic output device, or an olfactory output device.

12. A device comprising:

a processing system including at least one processor; and a non-transitory computer-readable medium storing instructions which, when executed by the processing system, cause the processing system to perform operations, the operations comprising:

obtaining data about a food item that is being prepared for a consumer, wherein the data about the food item includes at least one of: ingredients of the food item, a temperature at which the food item was prepared, a temperature at which the food item is to be served, at least one customization to the food item that was requested by the consumer, a quantity of the food item, a size of the food item, at least one other food item that is recommended to be paired with the food item, or nutritional information for the food item, and wherein the data about the food item is retrieved from a database of food items;

forwarding the data about the food item to an internet of things-enabled item of dinnerware used by the consumer to consume the food item, wherein the internet of things-enabled item of dinnerware comprises at least one of: a plate, a bowl, a drinking glass, a mug, a fork, a spoon, a knife, a pan, a pot, a cutting board, or a storage container, wherein the internet of things-enabled item of dinnerware includes at least one integrated sensor, and wherein the at least one integrated sensor comprises at least one of: an imaging sensor, an audio sensor, a temperature sensor, a pressure sensor, an accelerometer, a salinity sensor, a pH sensor, an ionic strength sensor, a droplet crystallinity sensor, or a biometric sensor;

receiving, from the internet of things-enabled item of dinnerware, data about consumption of the food item by the consumer, wherein the data about consumption of the food item by the consumer comprises at least one of: an amount of the food item that the consumer has consumed, a rate at which the consumer is consuming the food item, or an estimation of remaining time needed by the consumer to finish consuming the food item;

providing feedback to a drone for presentation to a person who prepared the food item, in response to the data about the consumption of the food item by the consumer, and the feedback comprises a signal that controls the drone to deliver an additional food item to the consumer, and wherein the drone is a separate device from the processing system and from the internet of things-enabled item of dinnerware; and providing feedback to the internet of things-enabled item of dinnerware for presentation to the consumer, in response to the data about the consumption of the food item by the consumer, wherein the feedback provided to the internet of things-enabled item of dinnerware is presented via an integrated input/output device of the internet of things-enabled item of dinnerware, and wherein the integrated input/output device comprises at least one of: a visual output device, an audio output device, a haptic output device, or an olfactory output device.

13. The device of claim 12, wherein the data about consumption of the food item by the consumer further comprises at least one of: a steadiness with which the consumer handles a utensil, a pressure applied by the consumer to the utensil, biometric data of the consumer that is collected at the time that the consumer is consuming the food item, or a response of the consumer to an inquiry presented via the internet of things-enabled item of dinnerware.

14. The device of claim 13, wherein the biometric data includes at least one of: a blood glucose level of the consumer, a blood alcohol content of the consumer, a skin conductivity of the consumer, or a breathing rate of the consumer.

15. The device of claim 12, the operations further comprising:

forwarding the data about the consumption of the foot item by the consumer to a health monitoring application with which the consumer is registered.

16. The device of claim 12, wherein the feedback to the internet of things-enabled item of dinnerware comprises a warning regarding at least one of: an ingredient of the food item, a temperature of the food item, or the rate at which the consumer is consuming the food item.

17. The device of claim 12, wherein the feedback to the internet of things-enabled item of dinnerware comprises a recommendation regarding another food item that pairs well with the food item.

18. The device of claim 12, wherein the feedback to the internet of things-enabled item of dinnerware comprises information about a source of the food item.

19. The device of claim 12, wherein the feedback to the internet of things-enabled item of dinnerware comprises an inquiry to be answered by the consumer.

20. The device of claim 19, wherein the inquiry relates to at least one of: a need for a refill of the food item, a need for another food item to be added to the food item, a need for a utensil to consume the food item, whether the consumer likes the food item, or whether the consumer would like to replace the food item with a different food item.

\* \* \* \* \*